(12) United States Patent
Zagorski et al.

(10) Patent No.: US 6,789,216 B2
(45) Date of Patent: Sep. 7, 2004

(54) PLATFORM INDEPENDENT MEMORY IMAGE ANALYSIS ARCHITECTURE FOR DEBUGGING A COMPUTER PROGRAM

(75) Inventors: Richard Frank Zagorski, Wauconda, IL (US); Paris E. Bingham, Jr., Aurora, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/259,313

(22) Filed: Sep. 27, 2002

(65) Prior Publication Data

US 2003/0028857 A1 Feb. 6, 2003

Related U.S. Application Data

(63) Continuation of application No. 09/234,843, filed on Jan. 22, 1999.

(51) Int. Cl.[7] .............................. G06F 11/00; G06F 9/44
(52) U.S. Cl. .............................. 714/38; 714/33; 714/45; 717/121; 717/128
(58) Field of Search .............................. 714/38, 37, 33, 714/45; 717/124, 128, 129, 121

(56) References Cited

U.S. PATENT DOCUMENTS

| | | | | |
|---|---|---|---|---|
| 5,361,351 A | * | 11/1994 | Lenkov et al. | ............... 717/124 |
| 5,519,859 A | * | 5/1996 | Grace | ............... 707/3 |
| 5,956,510 A | * | 9/1999 | Nicholas | ............... 717/137 |
| 6,071,317 A | * | 6/2000 | Nagel | ............... 717/128 |
| 6,108,659 A | * | 8/2000 | Vincent | ............... 707/101 |

OTHER PUBLICATIONS

Bezrukov, N. "Heuristic Methods of Improving Disassemby Quality" *Programming and Computer Software,* Consultants Bureau, New Yor, NY, USA, 14(4):195–203 (1988).

"General Debug Tool for Problem Determination" *Technical Disclosure Bulletin* 38(9):215–16 (Sep., 1995).

"Structure Formatting for Dump Formatters and Debuggers" *IBM Technical Disclosure Bulletin* 38(4):481–83 (Apr., 1995).

"Synchronization of Memory Dumps to a Template" *IBM Technical Disclosure Bulletin* 29(11):5133–34 (Apr., 1987).

* cited by examiner

*Primary Examiner*—Tim Vo
(74) *Attorney, Agent, or Firm*—Lahive & Cockfield, LLP

(57) ABSTRACT

A platform independent analysis architecture analyzes memory images for computer programs. The analysis architecture is platform independent in that it is not tied to a particular version of a computer program and is not dependent on the presence or absence of patches. In addition, the analysis architecture is not tied to the hardware architecture on which the analysis architecture runs. The analysis architecture dynamically determines data type definitions for a computer program to account for the hardware architecture on which the computer program runs, the version of the computer program that is running and the presence or absence of patches. As a result, accurate views of data types may be discerned at run time so that the views of the data types may be employed in analyzing memory images such as crash dumps and run time dumps. This analysis architectures greatly assists parties in debugging computer programs as a result.

23 Claims, 8 Drawing Sheets

| DATA TYPE OBJECTS, 38 | |
|---|---|
| NAME | 68 |
| PRODUCT | 70 |
| PATCH | 72 |
| PROPERTIES | 74 |
| REFERENCE COUNT | 76 |
| DICTIONARY KEY | 78 |
| SOURCE KEY | 80 |
| POINTER TO TAG LIST | 82 |
| FLAGS | 84 |
| METHODS | 86 |

FIG. 9B

Merlin Object: sds/vmcore.2 -- "kthread_t" 0x10402040

Navigate View Properties

Send To Editor

▽ Index 0   ◁ ▷ Slide Increment  0x1    ◁ ▷ Slide Offset  0

| Address | Tag Name | Tag Value | Comment |
|---|---|---|---|
| 0x10402040 | t_link | 00000000 | dispq, sleepq, and free queue link |
| 0x10402044 | t_stk | 0x10401650 | base of stack (kernel sp value to use) |
| 0x10402048 | t_startpc | Mod?:_PROCEDURE_LINKAGE_TABLE_ | PC where thread started |
| 0x1040204c | t_bound_cpu | 00000000 | cpu bound to, or NULL if not bound |
| 0x10402050 | t_affinitycnt | 0 | nesting level of kernel affinity-setting |
| 0x10402052 | t_bind_cpu | 0xffff | user-specified CPU binding (-1 if none) |
| 0x10402054 | t_flag | 0000 | modified only by current thread |
| 0x10402056 | t_proc_flag | 0000 | modified holding ttproc(t)->p_lock |
| 0x10402058 | t_schedflag | 0x3d | modified only in sched() |
| 0x10402069 | t_pre_sys | 00 | pre-syscall work needed |
| 0x1040205a | t_preempt | 0000 | don't preempt thread if set |
| 0x1040205c | t_state | 0x00000010 | thread state (protected by thread_lock) |
| 0x10402060 | t_pri | 96 | assigned thread priority |
| 0x10402062 | t_epri | 0 | inherited thread priority |
| 0x10402064 | t_pcb | 1007dc3c.10401ad8 | pcb, save area when switching |
| 0x1040206c | t_wchan0 | 0x00000000 | beginning of quad word (lwpchan) |
| 0x1040206e | t_wchan | Mod?:_PROCEDURE_LINKAGE_TABLE_ | reason for blocking |
| 0x10402070 | t_sobj_ops | Mod?:_PROCEDURE_LINKAGE_TABLE_ | |
| 0x10402074 | t_cid | 0x00000000 | scheduling class id |
| 0x10402078 | t_clfuncs | genunix:sys_funcs+10 | scheduling class ops vector |

PLATFORM INDEPENDENT MEMORY IMAGE ANALYSIS ARCHITECTURE FOR DEBUGGING A COMPUTER PROGRAM

This application is a continuation of Ser. No. 09/234,843 filed on Jan. 22, 1999.

TECHNICAL FIELD

The present invention relates generally to computer systems and more particularly to a platform independent memory image analysis architecture for debugging a computer program.

BACKGROUND OF THE INVENTION

The debugging of a computer program generally entails manipulating data in a memory image file that contains a snapshot of the memory used by the computer program. The memory image file may be generated either during execution of the computer program or at the time of failure of the computer program. A memory image file generated during execution is known as a "run time dump," whereas a memory image file generated at the time of failure is known as a "crash dump" or a "post-mortem dump."

In order to properly analyze a memory image file, one must appreciate the data types of the data contained within the memory image file. Definitions of the data types are contained within the source code of the computer program. When a party seeks to decode the memory image file manually, the party examines the source code looking for data type definitions within the source code. The party then applies the discovered data type definitions to interpret the data in the memory image file. The party may instead use general application automated debugging programs to assist in analyzing the data in the memory image file. The debugging program reads data type definitions from debug tables that were built by a compiler when the computer program was compiled.

Parties may also use custom tools to help examine the memory image file. These custom tools are typically custom built to examine a particular variety of memory image file. For example, such custom automated tools may be customized to examine memory image files for a particular instance of an operating systems (e.g. a given version of an operating system running on a particular hardware platform).

One difficulty with conventional tools concerns the static nature of data type definitions. Data type definitions are often static in that they are tied to a particular platform, operating system version, patch or patch version. For example, the integer ("int") data type may be designated as a signed 16 bit value defined for a first hardware platform, a signed 32 bit data type when defined for a second hardware platform and a signed 64 bit data type when defined for a third hardware platform. Each data type representation is statically written into the program source file and statically encoded into the debug tables that are produced by the compiler when compiling the program source file.

Automated debugging tools are built to understand and interpret memory image files for a particular hardware platform and a particular version of an operating system with a particular set of patches. As a result, automated debugging tools cannot be used on multiple hardware platforms, with multiple versions of the operating system or with multiple instances of the operating system containing different patches. Hence, separate automated debugging tools must be provided for each combination of hardware platform, operating system version and patch.

SUMMARY OF THE INVENTION

The present invention addresses the above-described limitations of conventional memory image file analysis tools. The present invention provides an analysis architecture that is platform independent (i.e. not statically dependent on an underlying platform), not tied to a particular version of a program and not dependent on the presence or absence of patches. The analysis architecture dynamically determines data type definitions to account for the hardware architecture on which the program runs, for the version of the program that is running and for the presence or absence of patches. The data type definitions may be fully resolved at the time in which a request is made to view a given data structure or object within the memory image file. The present invention also facilitates the ability to symbolically access data to enhance the ease with which the data in the memory image file may be accessed.

In accordance with one aspect of the present invention, a computing environment includes tools for accessing data in memory images. A first program source defines a data type to have a first set of characteristics (e.g. size, alignment, etc.). A first memory image is produced for the first program source. A second program source also defines the data type but defines the data type to have a second set of characteristics that differ from the first set of characteristics. A second memory image is provided for the second program source. An analysis tool is used to dynamically determine the first set of characteristics of the data type. The analysis tool employs knowledge of the first set of characteristics and accesses data of the data type of the first program source. The same analysis tool dynamically determines the second set for characteristics of the data type and employs knowledge of the second set of characteristics to access data in the second program source. The first program source and the second program source may be computer programs, such as operating systems or even different versions of a common operating system. The first program source and the second program source may differ as to whether they include a given patch or not. Thus, the analysis tool is not statically tied to a single program source by rather may be used with multiple program sources.

A computer program may be processed, such as by passing the computer program through a compiler, to identify computer system independent attributes of a selected data type defined within the computer program. These attributes may include attributes that are not tied to the computer platform on which the program runs. The computer system independent attributes are stored in a template. The template is subsequently used in accessing data in the memory image of the selected data type. The template encapsulates the computer system independent attributes. The template may be used to overcome the limitations of static data type definitions by providing a characterization of the data type that has no computer system dependencies. Hence, the image analysis tool does not fail or falter by encountering data in a format different from what is expected.

In accordance with another aspect of the present invention, a program operation context is provided to hold information regarding a context in which a computer program runs on a computer system. An analysis facility identifies information on a program operation context that influences attributes of a data type that is defined within the computer program. The analysis facility creates a view of the data type based on the information that is identified and employs the view in analyzing a memory image for the computer program. Thus, the analysis facility is adaptable to account for dependencies that are particular to the computer program instance being run and the platform on which the computer program is being run. As a result, the analysis facility can be used on different platforms and with different computer program instances without fearing problems caused by computer system dependencies.

In accordance with a further aspect of the present invention, a memory image is provided to hold data from a computer program that runs on a computer system. A computer program is processed to extract attributes of a selected data type that are independent of a program operation context for the computer program. The extracted attributes are stored in the template and the attributes of the template are used to create a data type object for holding information regarding a selected data type. The data type object is completed using information that is dependent on the program operation context. The data type object is then used in accessing data in the selected data type in the memory image file. In particular, the data type object may be used to generate a data object that identifies the data of the selected data type from the memory image file. In this fashion, the attributes of the selected data type that are dependent on the program operation context and the attributes of the selected data type that are independent of the program operation context are taken into account. The characterization of the selected data type is ensured to be accurate.

It should be appreciated that the data type objects need not be created from the templates but rather may be separately created.

BRIEF DESCRIPTION OF THE DRAWINGS

An illustrative embodiment consistent with the principles of the present invention will be described below relative to the following drawings.

FIG. 9B depicts an example of an object window.

DETAILED DESCRIPTION OF THE INVENTION

Figure 1:
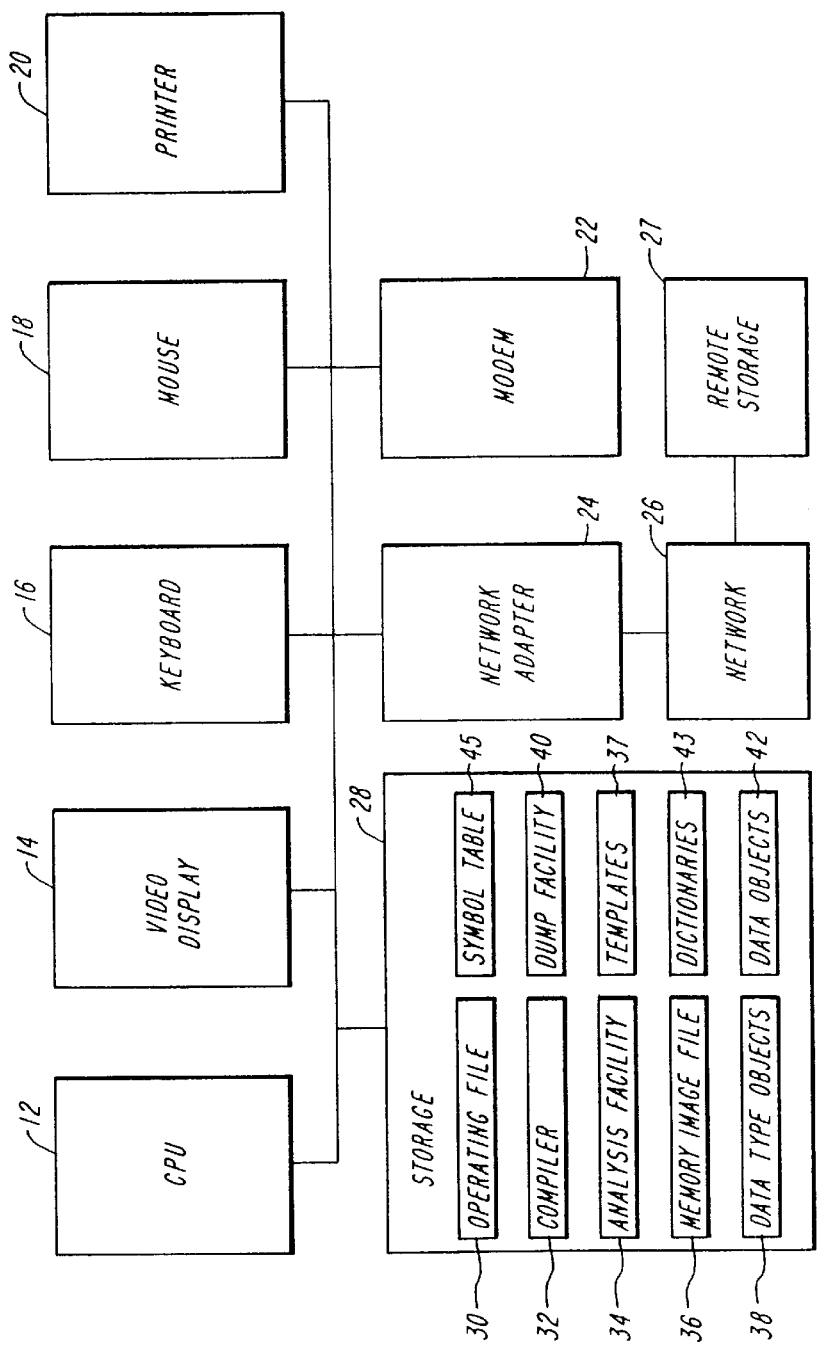
FIG. 1 is a block diagram of a computer system that is suitable for practicing the illustrative embodiment.

The illustrative embodiment provides a platform independent memory image analysis architecture for assisting in the debugging of a computer program. The memory image analysis architecture is "platform independent" in that the architecture may be used on different hardware platforms with different computer program versions, which may contain patches. The memory image analysis architecture dynamically accommodates the computer program version being debugged, the presence or absence of any patches for the computer program and the underlying hardware architecture on which the computer program runs. The memory image analysis architecture is not statically associated with a particular instance of a computer program. The memory image analysis architecture does not need to be programmatically revised each time that a different hardware configuration is used or each time that a new version of the program is analyzed.

The illustrative embodiment employs data type definition templates ("templates") to help overcome the problems presented by static data type definitions. Each template is a representation of a data type that is taken directly from the source code of a computer program where the associated data type is defined. The template reduces the data type definition to a pure, simple, computer system independent form. The templates capture characteristics of the data type that may be helpful to the memory image analysis architecture in analyzing data without the risk of presenting an unwanted dependency to the architecture. The templates cannot be used directly with the memory image file because the memory image file contains computer system dependencies. As such, the illustrative embodiment takes measures to account for such dependencies. Data type objects are created to hold both the computer system independent and computer system dependent aspects of a data type. The computer system dependent aspects (such as the size of a data type, the proper alignment of a data type and the like). are derived from a program operation context that contains all of the information necessary to complete the computer system dependent portions of the data type definition.

When a user of the memory image analysis architecture requests to access data of a given data type in the memory image file, the memory image analysis architecture builds a data type object for the given data type. The building of the data type object begins with loading a template for the given data type into the data type object. The analysis architecture constructs the full data type object by analyzing the constituent parts of the template to fully characterize the data type. Initially, the memory image analysis architecture determines the data type that the template represents. For example, the memory image analysis architecture may determine that the data type for the template is an array, a record or a primitive. The data type may include one or more tags, (i.e. attributes or fields). The tags are processed in a recursive manner such that, as each tag is analyzed, the data type definition template is retrieved for the data type of the tag, and a skeleton data type object is created for the tag. If the data type definition template for the tag is an aggregate data type, templates for the respective subordinate tags are also brought into skeleton data type objects.

For example, suppose that a tag represents a record of a record data type. Further suppose that the record data type is an aggregate data type (i.e. is a data type that contains tags of additional data types) having a subordinate integer tag and a subordinate boolean tag. The two tags in the record are resolved to complete the resolution of the higher level record tag. This recursive resolution process continues until all of the skeleton data type objects have been the resolved down to primitives. The primitives are data types that need no resolution. An integer data type is an example of a primitive. Upon reaching a primitive in the resolution process, the memory image analysis architecture begins backtracking to convert the skeleton data type objects into real data type objects by applying dependencies from the program operation context, such as the size of primitives and the proper alignment of subordinate data types.

The data type objects are used to provide a view into the memory image file in that each identifies the layout and meaning of data in the memory image file for a particular data type. The data type objects are used to help create data objects for data in the memory image file. The data may then be referenced symbolically by object name by referencing the data object. The data objects hold a reference to a data type object for the data type of the referenced data and a reference to the address in the memory image file where the referenced data begins in the memory image file.

The memory image analysis architecture facilitates symbolic access to the memory image file data. For example, a given instance of data in the memory file may be referenced symbolically by a user to request that actions be performed on the data. For example, the user may request that the data be displayed by identifying an object type in the request. The ability to reference data symbolically greatly simplifies the user interaction model with the memory image analysis architecture.

The memory image analysis architecture is both extensible and flexible. The memory image analysis architecture is extensible in that it facilitates the addition of new data types in a computer program. Since the memory image analysis architecture is not tied to a particular instance of a computer program, new data types may be added to the computer program and properly handled by the memory image analysis architecture. The memory image analysis architecture is flexible in that it can adapt to changes within the data type definitions contained within the computer program.

In large regard, the memory image analysis architecture may be viewed as treating the memory image file as if the memory image file were an object oriented database. The memory image analysis architecture builds a database of templates for data types and then generates data objects using the templates and the data contained within the memory image file. The result is akin to a database of objects for the memory image file data wherein each data type defined within the computer program is described by an associated object.

In order to clarify the discussion below, it is helpful to explain some of the terminology that will be used below.

The discussion below makes use of the terms "object class," "object," and "instance." An "object class" refers to a group of objects with similar attributes, behavior and common semantics. An object class definition refers to a definition that defines the attributes and methods or functions for a given group of objects. An attribute refers to a data value held by objects in a given object class. The functions or methods are those that may be applied to a given object within a class. An "object" refers to a given "instance" of the object class. For example, an object "myarray" may be defined to be of the array object type. The object type definition identifies the attributes for the array object type and identifies methods that may be performed on the array object type.

A "patch" is an added feature or function that is provided in a separate section of code to embellish a computer program.

A "computer program" constitutes a set of instructions that execute on a central processing unit (CPU) of a computer system. The phrase "computer program" encompasses applications, user-written programs, vendor-written programs, operating systems and add-ons to the operating system.

"Data type" refers to a definition of a set of data that identifies the possible range of values for the set and how the values are stored in memory.

"Computing resources" are any hardware or software resources that a computer program may seek to utilize.

A "compiler" refers to a program that transforms a set of symbols into another set of symbols in accordance with a set of rules. The compiler translates source code into object code. Generally, the source code is written in a high level language that is compiled by the compiler into executable machine code or a variation of machine code.

A "memory image" refers to a snapshot of the memory space used by a computer program. The memory image file may be the product of a dump facility.

A "template" refers to a form or structure that is used to hold machine independent information regarding data types that is used to build data objects, as will be described in more detail below.

An "operating system" refers to a computer program or software that is responsible for controlling the allocation and usage of hardware resources on a computer system. It should be appreciated that the operating system need not be tied to a particular hardware architecture but may reside on top of a virtual machine that abstracts away the underlying hardware architecture dependencies.

FIG. 1 depicts a computer system 10 having a hardware architecture that is suitable for practicing the illustrative embodiment. Those skilled in the art will appreciate that the configuration of the computer system depicted in FIG. 1 is intended to be merely illustrative and not limiting of the present invention. For instance, the present invention may also be practiced with a distributed computing system or with a tightly-coupled computer system that includes more than one processor. Moreover, those skilled in the art will appreciate that the computing environment in which the present invention is practiced may have different components from those depicted in FIG. 1.

The computer system 10 includes a central processing unit (CPU) 12 for executing computer program instructions. The CPU 12 may be any of a number of well known conventional microprocessors. The computer system 10 may also include a number of input/output devices, including a video display 14, a keyboard 16, a mouse 18 and a printer 20. The computer system 10 may include a modem 22 for communicating with remote computing resources. The modem 22 may be a conventional modem that connects to a traditional analog telephone line or may, alternatively, be a cable modem that connects to a cable line or a wireless modem that transmits data over the airwaves. The computer system 10 may include a network adapter 24 for interfacing the computer system with the network 26.

The computer system 10 includes a storage 28 for holding both programs and data. The storage 28 may encompass both primary memory and secondary memory. A number of different storage devices may be utilized to implement the storage 28. For example, the storage 28 may include RAM, ROM, EPROM, EEPROM, flash memory, floppy disk drives, hard disk drives, optical disk drives and the like. The storage 28 holds a copy of an operating system 30. For purposes of the discussion below, it is assumed that the operating system 30 is the Solaris operating system sold by Sun Microsystems, Inc. Those skilled in the art will appreciate that the present invention may also be practiced with other operating systems. More generally, the present invention may be practiced with a variety of different types of computer programs where analysis of the memory image is useful. The storage 28 need not be located locally but rather may be located remotely, like remote storage 27. The remote storage 27 may supplant the local storage 28 or may work in conjunction with the local storage to share storage responsibilities.

The operating system 30 may include one or more patches It is presumed that the applied patches are identified within the code that constitutes the patches or within header files. It is also presumed that the version number of the operating system 30 is contained within the operating system code. Still further, it is assumed that the computer system 10 is able to identify the hardware architecture that is provided therein.

The storage 28 holds a copy of a compiler 32, such as a C language compiler. Those skilled in the art will appreciate that the present invention is not limited to a particular variety of compiler for a particular high level programming language. The compiler 32 is modified to prevent object code from being generated from the source code; instead the compiler analyzes or process the computer program (e.g. the operating system 30) to produce data type definition templates ("templates"). As will be explained in more detail below, the compiler 32 processes the operating system 30 looking for reserved words that identify locations in which constants, data structures, enumerations, functions, unions and other data type definitions are syntactically identified. Those skilled in the art will appreciate that the templates need not be produced by a compiler but rather may be produced by other means. For example, in some environments interpreters rather than compilers may be used. In such environments, the interpreter may be modified to produce the templates. A Java™ interpreter is an example of such an interpreter. Moreover, where the present invention is practiced on a computer program that is written in a language other than the C programming language, other reserved words may be sought by the compiler.

The storage 28 holds a copy of the analysis facility 34. The analysis facility 34 is the tool (in the form of a module, program or set of programs) that enables a user to gain access to data contained within the memory image file 36. The analysis facility 34 contains a graphical user interface (GUI) that allows a user to view data within the memory image file 36 and to perform operations relative to the memory image file.

The memory image file 36 contains a snapshot of memory used by the computer program, including data values, stack values and the like. Those skilled in the art will appreciate that the memory image need not be stored in a "file" per se, but rather may be stored in other fashions. Thus, the present invention works more generally with a memory image. In the illustrative embodiment, the memory image file 36 is the product of a dump facility 40 or other image facility that generates a memory image upon failure of the computer program. In the illustrative embodiment, the dump facility 40 may be any of a number of known dump facilities that operate with operating systems. For example, the crash dump facility provided with the Solaris operating system may be used.

The storage 28 includes templates 37, data type objects 38 and data objects 42. As was mentioned above, the templates 37 hold computer system independent information regarding data types. The data type objects 38 to hold information that is extracted about a data type from the computer program that defined the data type. This extraction of information will be described in more detail below. The data objects 42 associate the data type objects 38 with data for a particular instance at a specified address within the memory image file 36.

The storage 28 also hold structures that are helpful in locating data and the like. Dictionaries 43 are provided by the analysis facility 34 to correlate data types with templates and with source code. The creation of the dictionaries will be discussed in more detail below. A symbol table 45 is generated by the dump facility 40 and is used to translate symbols into addresses. For example, information regarding symbols that represent the name of the data structures is contained in the symbol table 45. The symbol table 45 identifies the starting addresses of certain data structures for which data is held in the memory image file 36.

Figure 2:
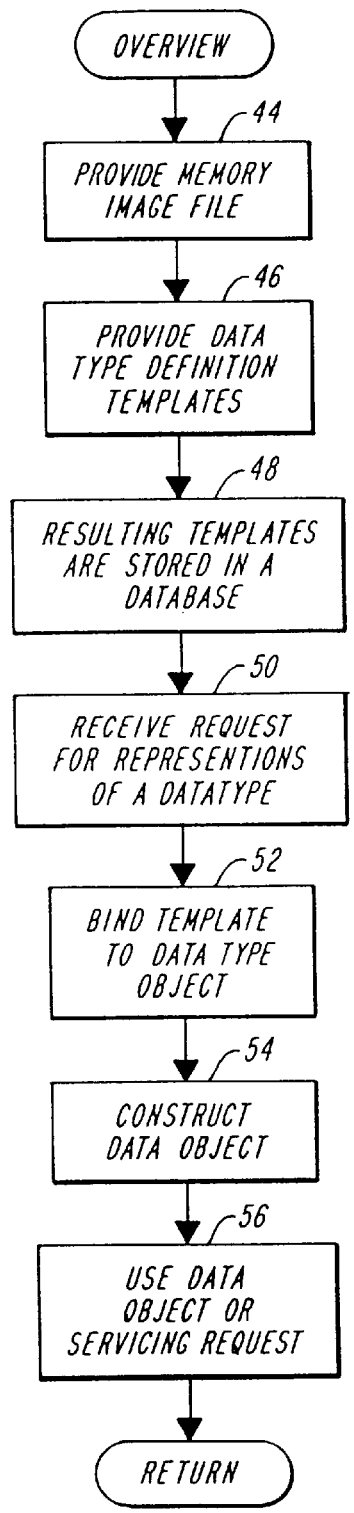
FIG. 2 is a flow chart that provides an overview of steps performed in the illustrative embodiment to analyze a memory image file.

FIG. 2 provides an overview of the steps that are performed to analyze the data within the memory image file 36 in the illustrative embodiment, which is consistent with the principles of the present invention. A memory image file 36 is provided (Step 44 in FIG. 2). The memory image file 36 may be retrieved from memory or may be generated on the fly. The memory image file 36 may be generated by a crash dump facility or by a runtime dump facility. Data type definition templates are provided (Step 46 in FIG. 2). These templates may be either pregenerated or generated on the fly by processing a computer program associated with the memory image file 36. In the illustrative embodiment, templates are generated for every program source file for a given major release of the program and one of the dictionaries 43 cross-references the data types with templates and with source files. The templates 37 are stored within the storage 28 as part of a template data base (Step 48 in FIG. 2).

The compiler 32 is used to generate the templates. The respective program source files of the computer program are passed through the compiler 32, which has been modified to generate the templates.

The compiler 32 looks for reserved words in the computer system text that correspond to data type definitions and extracts information from the data type definitions for the templates 37. For example, if the computer system 30 is written in the C programming language, the compiler 32 looks for reserved words such as #define, struc, enum, union, □ and functions definitions that return objects.

A template 37 is a small representation of a data type that is derived directly from the source code of the computer program with all hardware, version and patch dependencies removed. For example, consider the following data type definition for a record data type (written in the C programming language):

struct record type {
datatype_a r_a;
datatype_b r_b;
datatype_a r_a2;
}.

This data type definition indicates that the record data type has two tags (i.e. "r_a" and "r_a2") of data type "a" that are each of size N1 (the defined size for data of data type a on the computer system) and a single tag (i.e. "r_b") of data type "b" of size N2 (the defined size for data of data type b). The tag r_a starts at offset 0; the tag r_b starts at offset N1; and the tag r_a2 starts at offset N1+N2.

The template for the record data type defined above is:
1. a tag r_a of type datatype_a
2. a tag r_b of type datatype_b
3. a tag r_a2 of type datatype_a The template contains no reference to the size or offset of the tags (as this may be hardware platform, version or patch dependent).

The templates 37 may additionally contain information regarding the section of the source computer program where the data type is defined. This information is helpful in displaying the section of code if requested by a user. Templates 37 may also contain attributes that hold values for computer system dependent information in a computer system independent fashion. For example, a page data type may have a SPARC™ microprocessor attribute when run on a SPARC workstation from Sun Microsystems, Inc. and an X86 attribute when run on a machine that employs an X86 processor from Intel Corporation.

In the illustrative embodiment, templates 37 are generated from every source file for a given release of the operating system 30. The dictionaries 43 are created to cross-reference data types with corresponding templates and with source code. One of the dictionaries 43 holds information that cross-references each template 37 with its data type. Another one of the dictionaries 43 cross-references each data type with the section of source code that defines the data type. A patch dictionary 43 hold cross references among data types that are changed or created by patches with the associated templates and source code sections.

Those skilled in the art will appreciate that the dictionaries may be differently organized than as discussed above. For instances, all the information regarding cross-references may be incorporated into a single dictionary. Furthermore, a much finer granularity may be applied to provide a large number of dictionaries, such as one dictionary per data type. In addition, those skilled in the art will appreciate that the dictionaries 43 are not necessary for practicing the present invention; other cross-referencing mechanisms may be used.

The templates 37 are utilized when a request is received to view a representation of a data type within the memory image file (step 50 in FIG. 2). For example, a user may request to view data of a specified data type. The illustrative embodiment defines data type objects for holding information regarding the specified data types. The generation of the data type objects entails binding templates to the objects such that the computer system independent information from the templates is added to the data type objects along with computer system dependent information that is dynamically added (step 52 in FIG. 2).

Figures 3, 4:
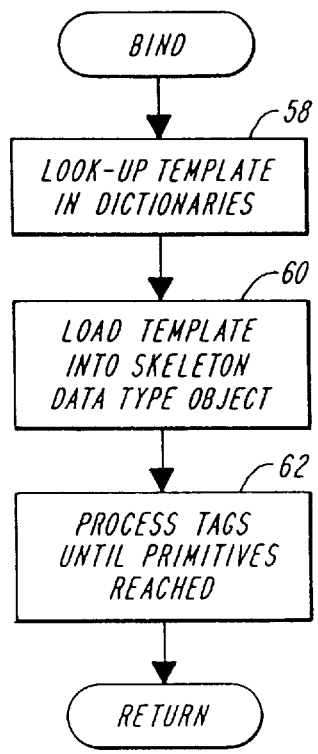
FIG. 3 is a flow chart illustrating the steps performed to bind a template to a data type object.
FIG. 4 is a logical diagram of a data type object.

FIG. 3 depicts a flow chart of the steps that are performed to bind a template to a data type object. Initially, the name of the data type is looked up in a dictionary 43 to identify a template from the data type (step 58 in FIG. 3). The analysis facility 34 examines information in the program operation context (such as the type of hardware platform on which the computer program is running, the version of the computer program, and what patches are installed) to determine the most specific template that is correct for the memory image file 36. For example, suppose that attributes, such as size and alignment of the integer data type, vary depending upon the set of characteristics of hardware platform, operating system version and whether a patch is installed. In that case, the program operation context is consulted to identify the hardware platform on which the computer program is running, to identify the version of the operating system and to identify whether the specified patch is installed. The template associated with the identified combination of hardware platform, computer program version and patch is selected. There may be other instances where a data type is not affected by the variables of hardware platform, computer program version or patches. Moreover, other data type definitions may be affected by only one of these variables or by two of these variables. In general, the above described approach starts off with the most general template and identifies if there is a more specific template for the given program operation context.

The information contained within the template is then loaded into the data type object that is created for the data type (step 60 in FIG. 3). The format of the data type object will be described in more detail below. For instance, the identity of the tags contained within the template may be loaded into the data type object. The tags are processed recursively until the data type of each of the tags is resolved solely to primitives (step 62 in FIG. 3). As each tag is analyzed, the associated template is retrieved and a skeleton data type object for the tag is created in the same manner as described above. If the template is for an aggregate data type that contains additional tags, the process is repeated recursively until all of the skeleton data type objects have been resolved down to primitives. The program operation context contains a set of data type objects that represent primitives for the computer system 10. Once the analysis facility 34 reaches a primitive, it begins backtracking to turn the skeleton data type objects into complete data type objects by applying computer system dependencies from the program operations context. The information that is added includes the size of primitives, the proper alignment data types and the like. After the recursive process is completed (see step 62 in FIG. 3), a complete computer system dependent version of the data type is represented in the data type object 38.

FIG. 4 depicts the format of a data type object 38 in more detail. In particular, FIG. 4 shows the attributes that are associated with the data type object 38. Those skilled in the art will appreciate that there are also a number of methods 86 that associated with the data type object 38. The name attribute 68 identifies the name of the data type object. The product attribute 70 identifies a product (i.e. a version) of the operating system in which the data type was defined. In instances wherein the data type was defined by a base product, the product attribute 70 has a null value. A patch attribute 72 identifies which patch, if any, is defined in the associated data type. In instances wherein the data type was not defined by a patch, the patch attribute has a null value.

The properties attribute 74 holds a properties object that contains property information regarding the associated data type. The dictionary key attribute 78 holds a key value corresponding to that included in the dictionary that identifies the location of the type object within the storage 28. The source key attribute 80 holds a value that identifies the key used in a second dictionary that identifies the location of the data type definition in the source code of the operating system.

Figure 5:
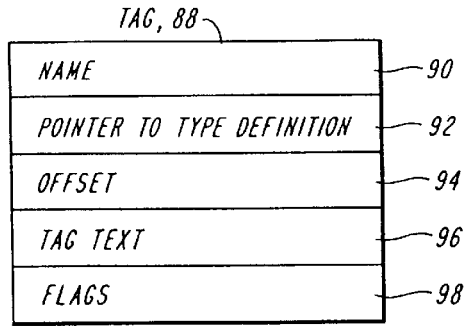
FIG. 5 is a logical depiction of an element of a tag list.

The pointer to tag list attribute 82 holds a pointer to an array that constitutes a tag list. Each attribute or field in the data type definition constitutes a separate "tag." These tags are identified in the tag list. For each tag, a tag data structure 88 like that shown in FIG. 5 is provided in the tag list. This structure 88 contains the name 90 of the tag as well as a pointer to the type definition 92 for the associated data type. An offset 98 value that identifies the offset 94 of the tag relative to the base of the data type is included. Text contained within the tag 96 is stored along with a copy of the flags 98. The flags are copied from the flags attribute 84 of the data type object 38. The flags identify the nature of the type definition (i.e. whether it is derived from an array, data structure, union, function, an enumeration, a bid field, local variable, global variable, an alias, a constant definition or the like).

The data type objects 38 may be generated at initialization of the analysis facility 34 or at other times. In some instances, the analysis facility 34 may be configured so as to generate certain data type objects at initialization and others upon demand.

Figure 6:
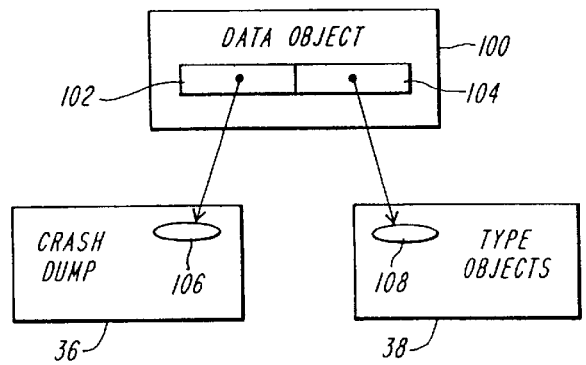
FIG. 6 illustrates the relationship between a data object, a memory image file and a data type object.

The data type objects 38 are used in combination with the memory image address contained within the symbol table 45 to construct the data objects 42 at the specified memory addresses. As is shown in FIG. 6, each data object 100 contains a reference 102 to an address 106 within the memory image file 36 and also contains a reference 104 to a type object 108 contained within the database of data type objects 38. The references 102 and 104 may take the form of pointers. The data object 100 may also include additional information other than the references. The data object 100 ties the data type to the given data at the specified memory address within the memory image file 36. The resulting data object 100 may be cached so that it does not need to be recreated for each subsequent request for the representation of the data type. The data object 100 serves to build an association between a portion of the memory image file data and the data type objects 38. The data object 100 can be queried symbolically for information or asked to instantiate another data object that it references. As a result, a symbolic programming paradigm may be used to access the data in the memory image file 36. Thus, the data object 100 may be used in servicing the request (Step 56 in FIG. 2).

Figure 7:
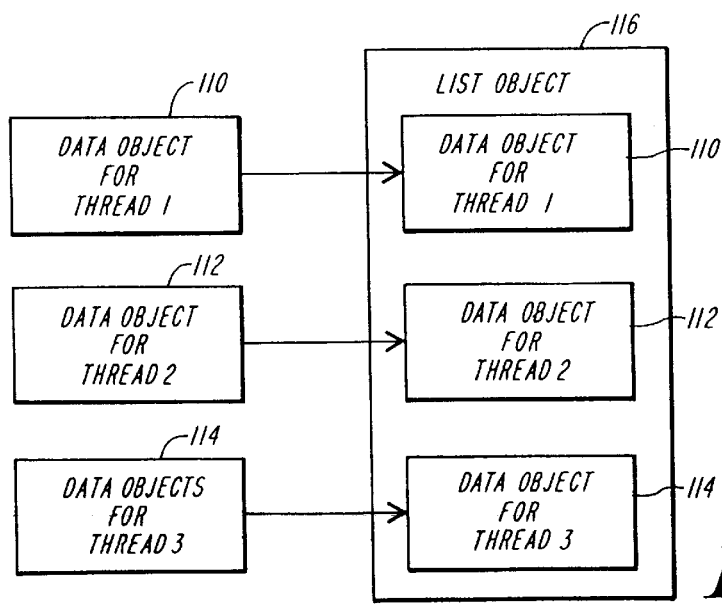
FIG. 7 depicts an example of a list object that is created from data objects.

The data objects may be utilized in developing higher level objects. For example, suppose that a data object 42 points to a particular instance of a thread. The analysis facility 34 may wish to present a user with a list of the threads in the system. To that end, the analysis facility 34 may create a list object 116 (see FIG. 7) for encapsulating various threads in the system. In the example shown in FIG. 7, data object 110 for thread 1, data object 112 for thread 2 and data object 114 for thread 3 are encapsulated into the list object 116. Those skilled in the art will appreciate that the higher level objects need not be limited to list objects but also may include other higher level objects, such as arrays and records. Moreover, the data objects 42 may be utilized to create and manipulate other types of objects.

Figure 8:
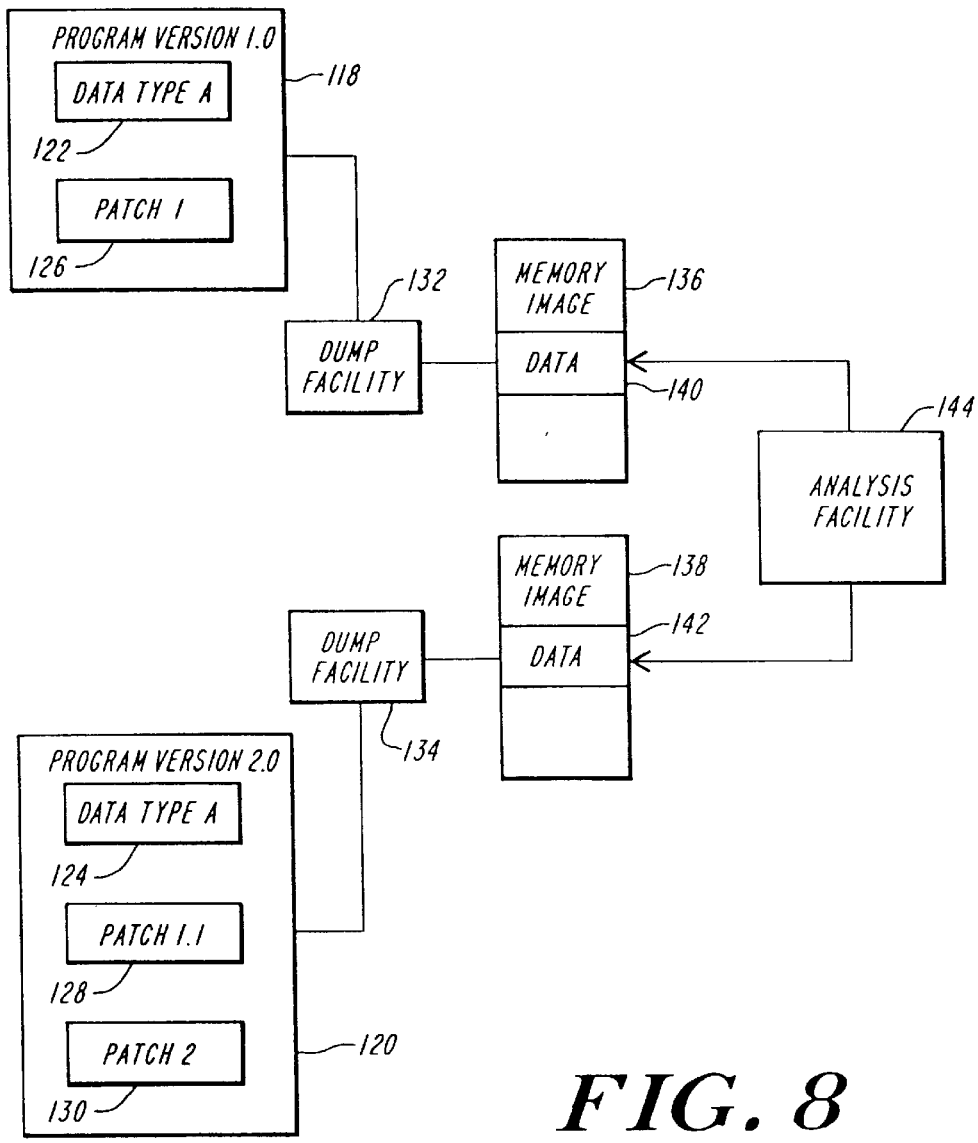
FIG. 8 depicts an example of using the analysis facility to analyze memory image files from differing program sources.

One of the benefits of the analysis facility of the illustrative embodiment is that it may be used to analyze memory images for different program sources. For example, as depicted in FIG. 8, suppose that version 1.0 of a program 118 contains a patch 126 and a definition 122 of data type A. Further suppose that a dump facility 132 is used to generate a memory image 136 for the computer program 118. The memory image contains data 140 of data type A. In addition, suppose that version 2.0 of the computer program 120 contains a definition 124 of the data type A and a different version 128 of the patch. Moreover, this version of the computer program 120 contains a second patch 130. This version of the computer program 120 is passed through a dump facility 134 to generate a second memory image 138. The second memory image contains data 142 of data type A. Despite the differences in the computer programs 118 and 120, the analysis facility 144 may be utilized to look at the data 140 and 142 for data type A. The size, alignment and other attributes of the data type A may vary with the respective computer programs 118 and 120. Nevertheless, the analysis facility 144 accounts for these variations in the attributes. The source computer programs 118 and 120 differ in version, patch versions and in what patches are applied. The analysis facility accounts for the differences.

Figure 9A:
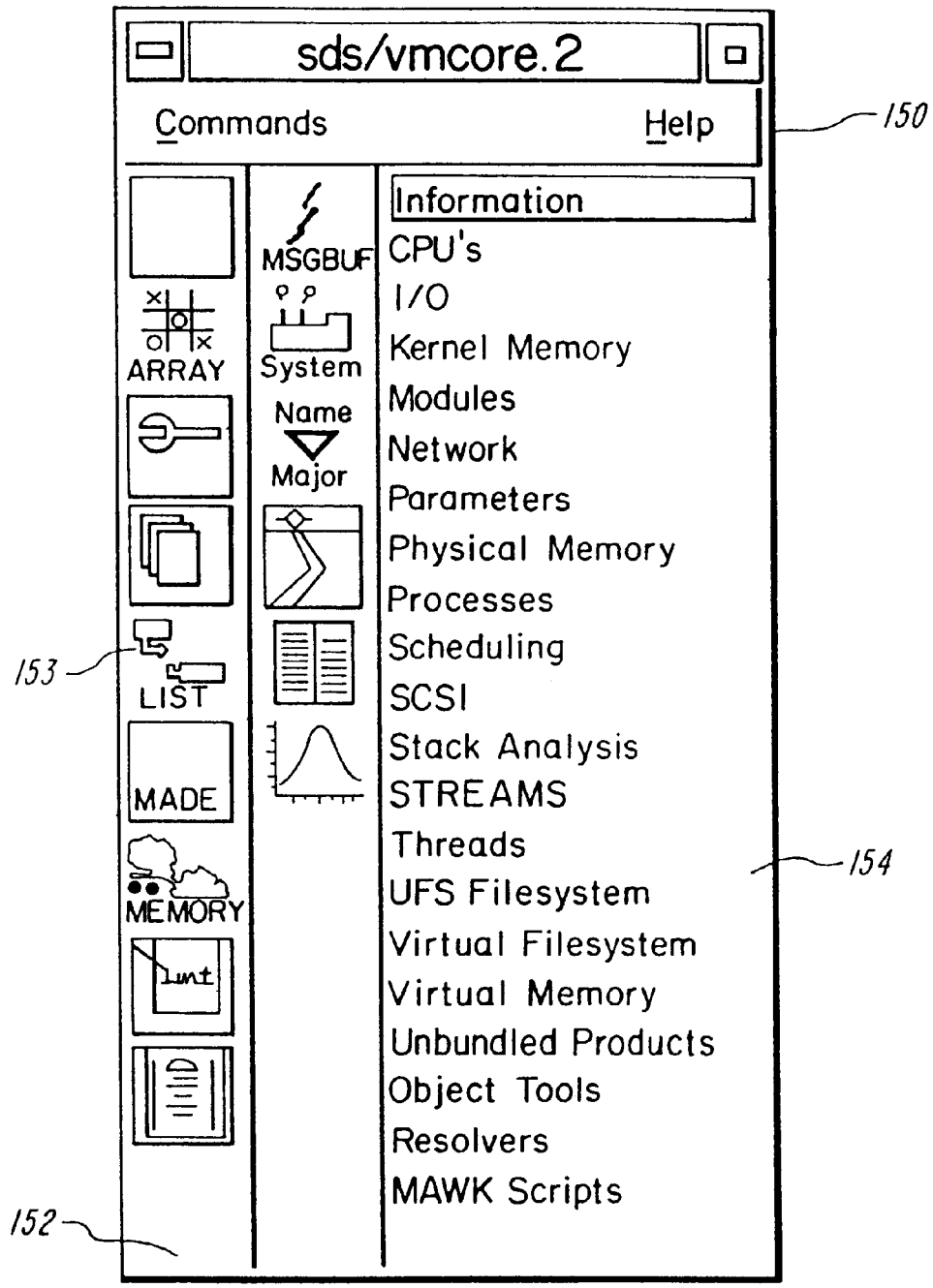
FIG. 9A depicts a coreview window for accessing memory image file data.

FIG. 9A depicts a coreview window 150 that is produced as part of the GUI by the analysis facility 34. The coreview window 150 serves as the basic window by which a user may navigate through the data contained within the memory image file 36. The coreview window contains a number of icons 152 that may be used to gain access to various functions and extensions that are provided by the analysis facility 34. A list 154 of options is also provided and may be selected by the user to gain access to the listed functions and extensions.

The coreview window 150 may be used as a vehicle for displaying data from the memory image file 36 for a particular object. FIG. 9B shows the object window 160 that is produced in such an instance. The client area 162 of the object window 160 contains information regarding the various tags that are part of the object. Each row of information shown in the client area 162 is associated with a particular tag that is part of the object.

Figure 9C:
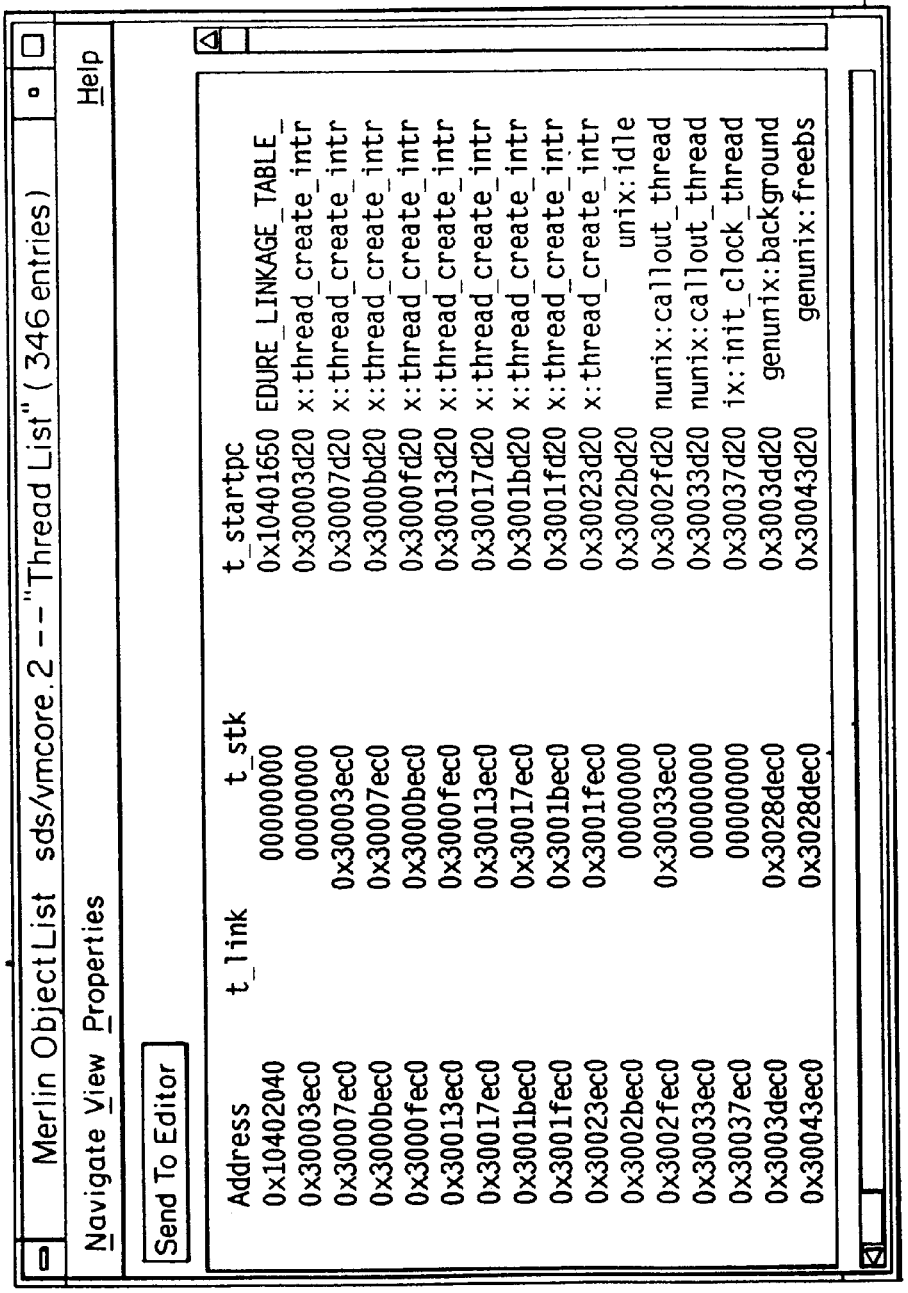
FIG. 9C depicts an example of a list window.

FIG. 9C shows a list window 164. The list window contains information regarding a number of different objects of the same object type. In example case depicted in FIG. 9C, the object are threads and the list window 164 depicts data for various threads. Each column is associated with either tags or information relating to the associated thread.

While the present invention has been described with reference to an illustrative embodiment thereof, those skilled in the art will appreciate that various changes in form and detail may be made without departing from the intended scope of the present invention as defined in the appended claims. For example, the present invention may not be practiced with an operating system but rather may be practiced more generally with system code or other computer programs for which analyzing a memory image file may be useful. The operating system need not be the Solaris operating system and the compiler need not be a C compiler or a C++ compiler but rather may be an interpreter. The system code may be written in the JAVA programming language, for example.

What is claimed is:

1. In a computer system of a given hardware architecture having a computer program that defines a; least one data type and an analysis facility for analyzing data for the computer program, a method comprising the steps of:

providing a memory image for the computer program, said memory image being a recording of contents of a memory space used by the computer program;

providing information regarding a context in which the computer program runs;

with the analysis facility, identifying information regarding the context in which the computer program runs that influences attributes of the data type and that indicates that the computer system has the given hardware architecture; and employing the information identified in the context in which the computer program runs in analyzing the memory image for the computer program with the analysis facility.

2. The method of claim 1 wherein the information in the program operation context that is identified as influencing attributes of the data type is that a patch is applied to the computer program.

3. The method of claim 1 wherein the memory image is produced while the computer program is running on the computer system.

4. The method of claim 1 wherein the memory image is produced when the computer program fails.

5. In a computer platform having a computer program that includes definitions of data types and a facility for generating memory images for the computer program far use in analyzing the computer program, a method comprising the steps of:

providing a memory image that has been generated by the memory image facility, said memory image being a recording of contents of a memory space used by the computer program;

processing the computer program to identify computer system independent attributes of the selected data type;

storing the identified computer system independent attributes in a template for use in accessing data in the memory image of the selected data type; and creating a data type object for the selected data type to hold information regarding the selected data type and storing information contained in the template in the data type object.

6. The method of claim 5 wherein the step of processing the computer program comprises passing the computer program through a compiler to generate the template.

7. The method of claim 5 wherein the compiler generates the template rather than generating object code.

8. The method of claim 5 wherein the step of processing comprises generating additional templates for data types other than the selected data type.

9. The method of claim 5 wherein the computer program includes a patch.

10. The method of claim 9 wherein the patch defines the selected data type.

11. The method of claim 9 wherein the computer program includes multiple patches.

12. In a computer platform having a computer program that includes definitions of darn types and a facility for generating a memory image for the computer program for use in analyzing the computer program, said memory image being a recording of contents of a memory space used by the computer program, a computer-readable medium holding computer-executable instructions for performing a method, comprising the steps of:

processing the computer program by passing the computer program through a compiler to identify computer system independent attributes of the selected data type and to generate a template for holding the identified independent attributes; and storing the identified computer system independent attributes in the template for use in accessing data in the memory image of the selected data type.

13. The computer-readable medium of claim 12 wherein the computer program includes a patch.

14. The computer-readable medium of claim 12 wherein the patch defines the selected data type.

15. The computer-readable medium of claim 14 wherein the computer program includes multiple patches.

16. In a computer system of a given hardware architecture having a computer program that defines at least one data type and an analysis facility for analyzing data for the computer program, a computer-readable medium holding computer-executable instructions for performing a method comprising the steps of:

providing a memory image for the computer program, said memory image being a recording of contents of a memory space used by the computer program;

providing a information regarding a context in which the computer program runs;

with the analysis facility, identifying information context in which the computer program runs that influences attributes of the data type and that identifies that the computer system has the given hardware architecture; and employing the information identified in the context in which the computer program runs in analyzing the memory image for the computer program with the platform agnostic analysis facility.

17. The computer-readable medium of claim 16 wherein the information that is identified as influencing attributes of the data type is that a patch is applied to the computer program.

18. In a computer system of a given hardware architecture having a computer program that defines a data type and analysis facility for analyzing data for the computer program, a transmission medium for transmitting computer-executable instructions for performing a method comprising the steps of:

providing a memory image for the computer program, said memory image being a recording of contents of a memory space used by the computer program;

providing a program operation context that provides information regarding a context in which the program runs;

with the analysis facility, identifying information in the program operation context that influences attributes of the data type;

creating a view of the data type based on the information that is identified; and employing the view of the data type in analyzing the memory image for the computer program with the analysis facility.

19. A computer platform, comprising:

a computer program that includes definitions of data types;

a facility for generating a memory image of the computer program for use in analyzing the computer program, said memory image being a recording of contents of a memory space used by the computer program;

means for processing the computer program to identify computer system independent attributes of the selected data type; and means for storing the identified computer system independent attributes in a template for use in accessing data in the memory image of the selected data type.

20. The computer platform of claim 19 further comprising a compiler for compiling the computer program to generate the template.

21. The computer platform of claim 19 wherein the computer program contains a patch.

22. The computer platform of claim 21 wherein the computer program contains multiple patches.

23. A computer system, comprising:

a computer program that runs on the computer system and that means for providing a memory image for the computer program, said memory image being a recording of contents of a memory space used by the computer program;

means for providing a program operation context that provides information regarding a context in which the program runs; and an analysis facility for analyzing data in the memory images comprising:

(i) means for identifying information in the program operation context that influences attributes of the data type;

(ii) means for creating a view of the data type based on the information that is identified; and (iii) means for employing the view of the data type in analyzing the memory image for the computer program with the analysis facility.

* * * * *